Feb. 18, 1941. P. KOLLSMAN 2,232,537
REMOTE CONTROLLED INDICATOR WITH STABILIZED
HEAD, PITCH, AND BANK INDICATING UNIT
Original Filed April 5, 1932   5 Sheets-Sheet 3
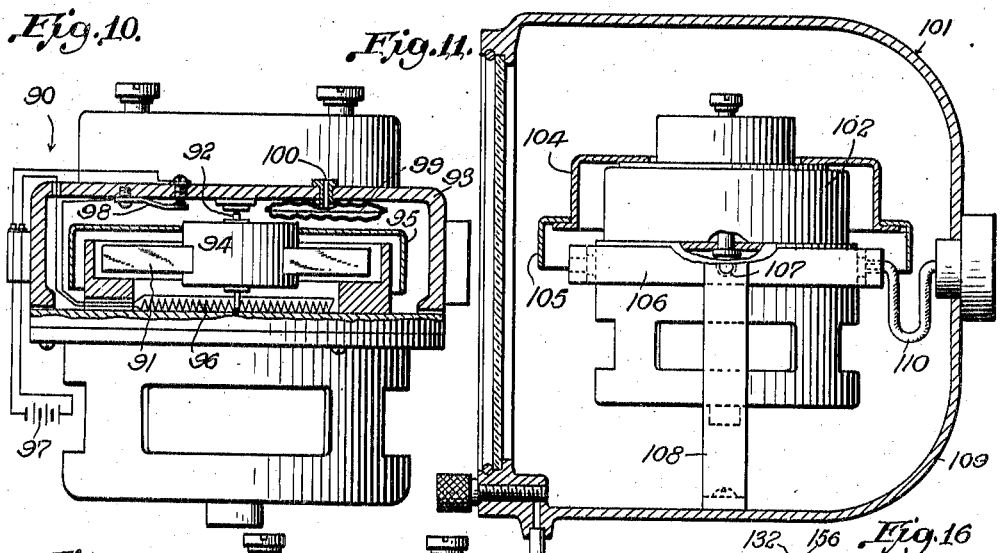
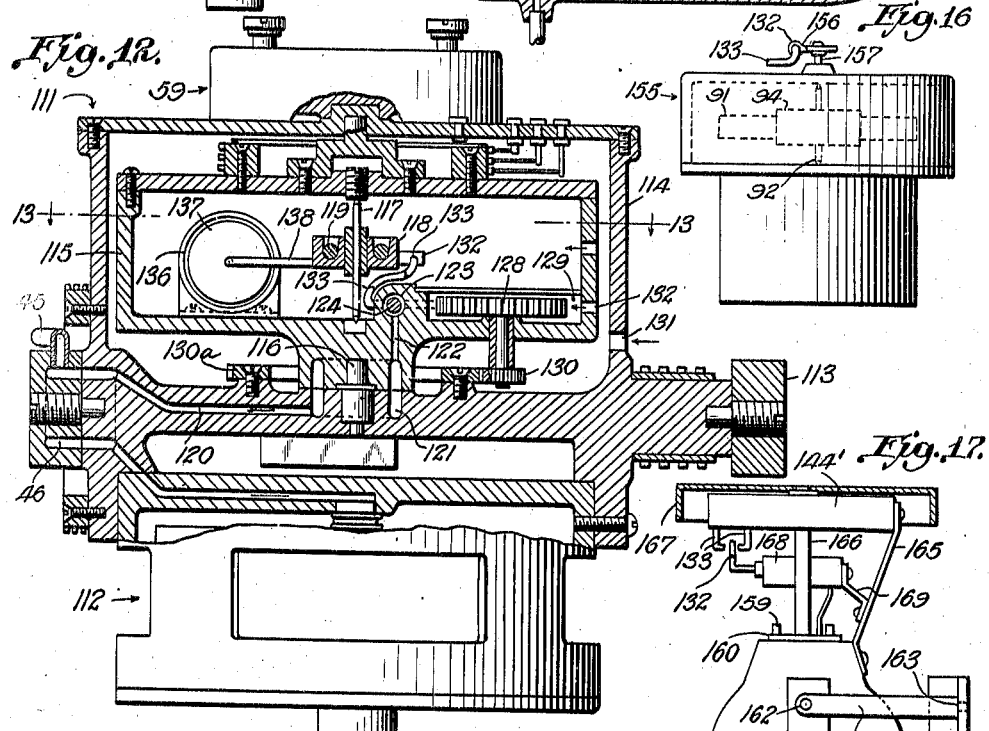
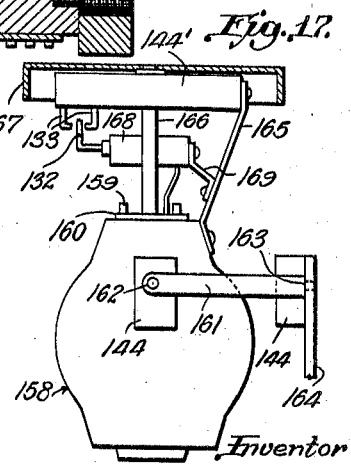
Inventor
PAUL KOLLSMAN

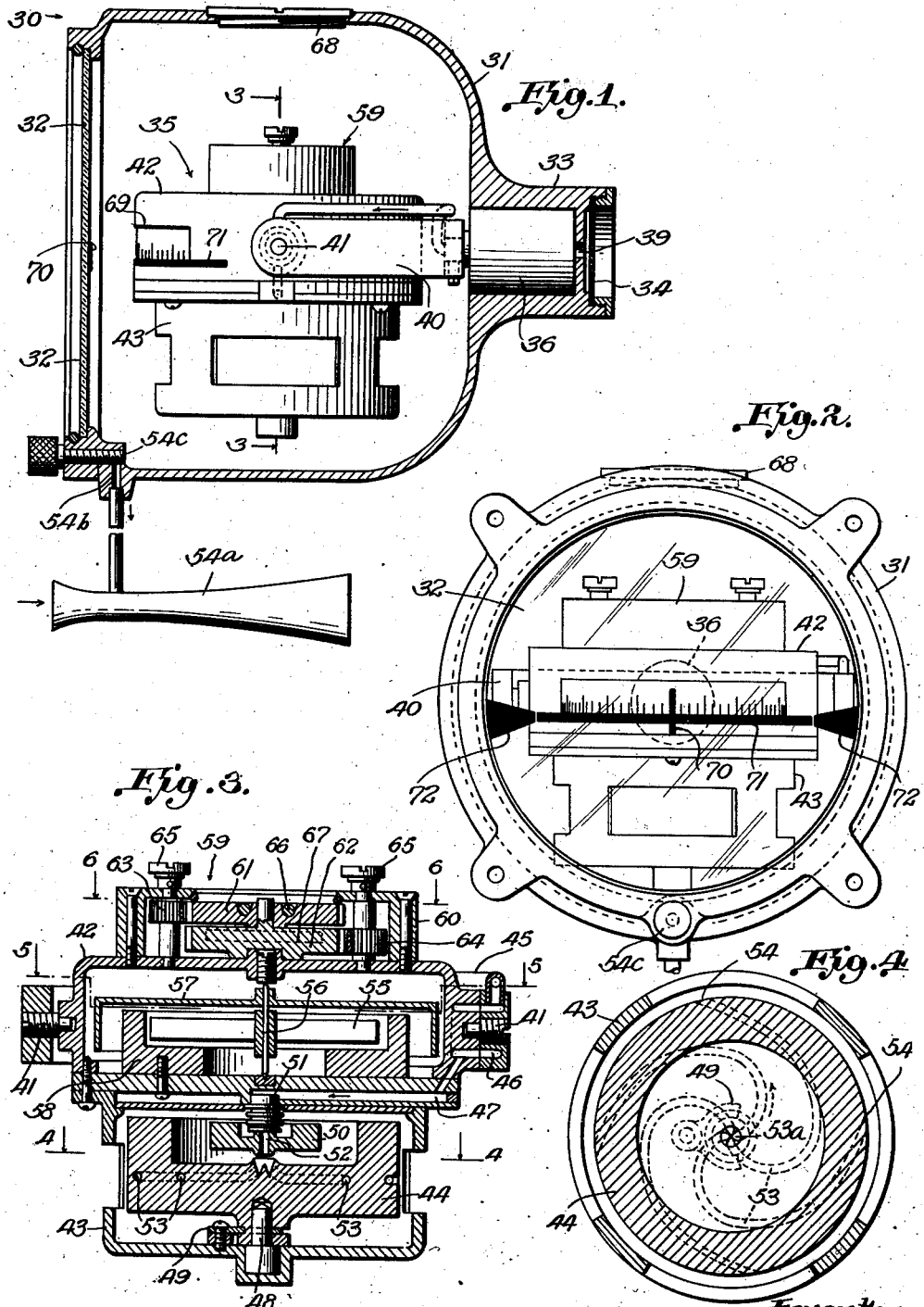

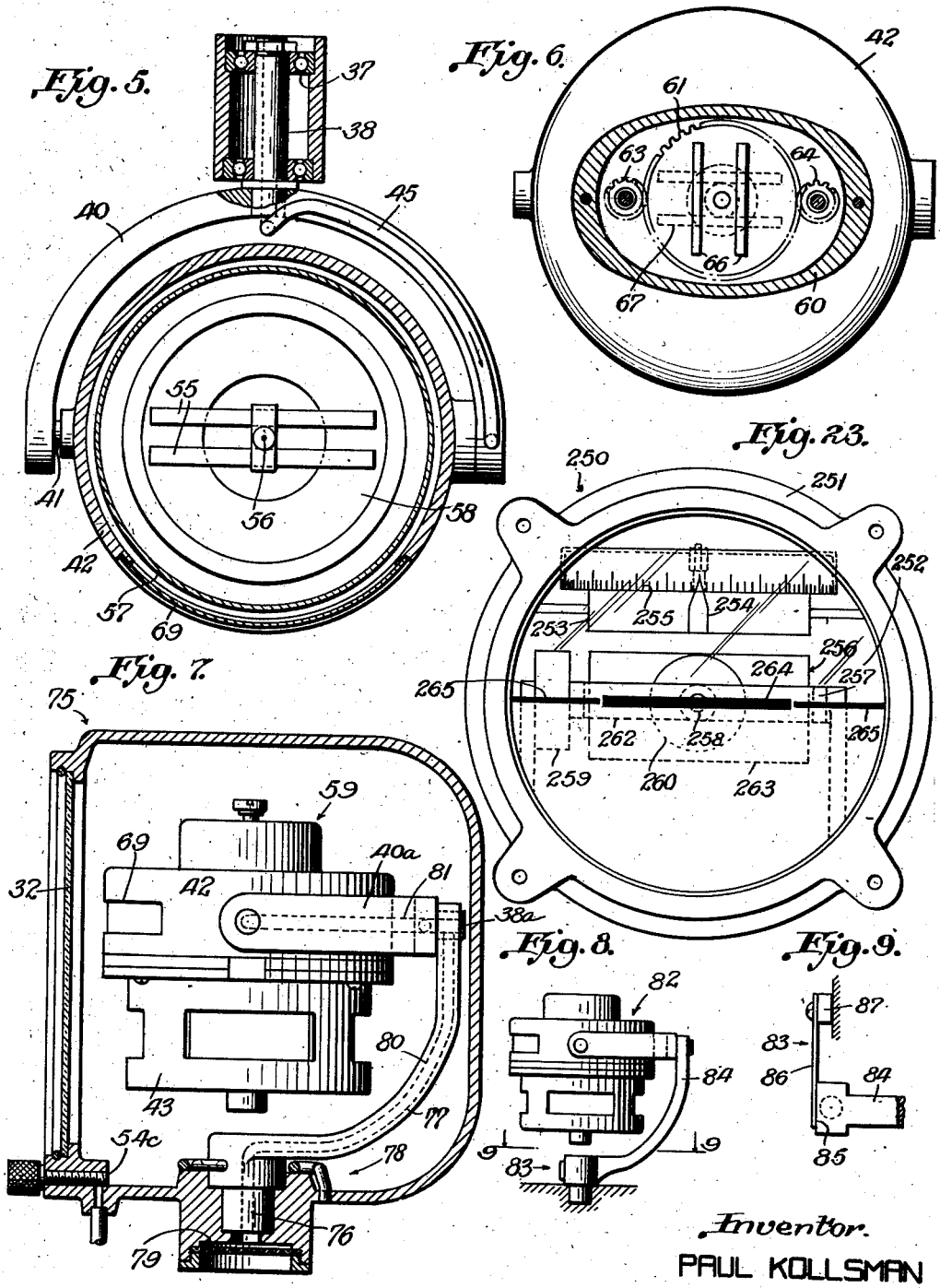

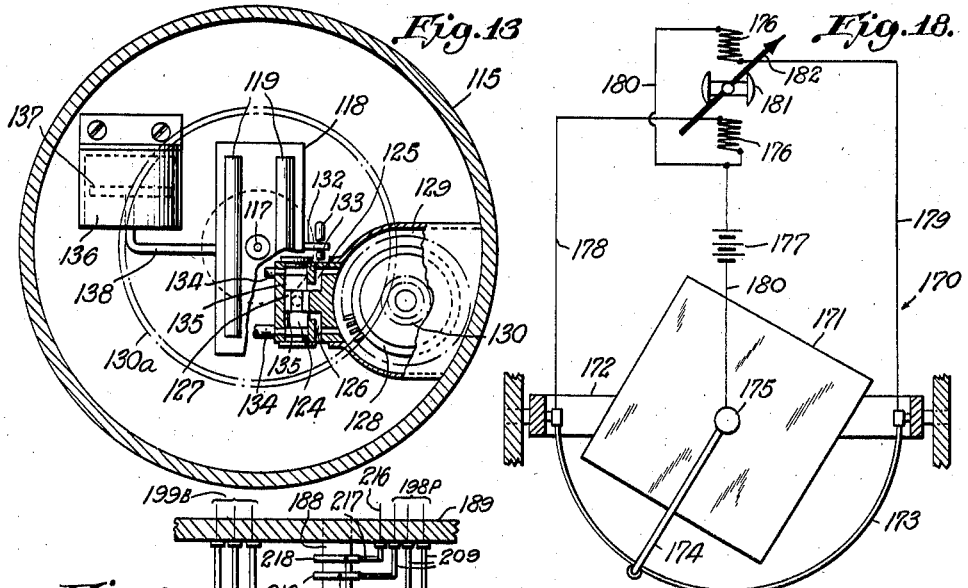
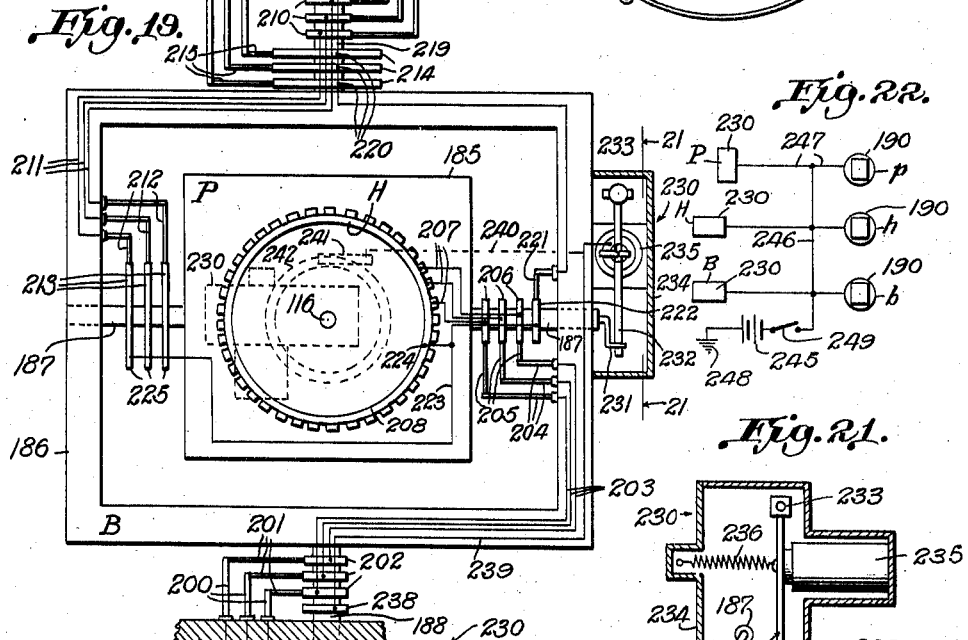
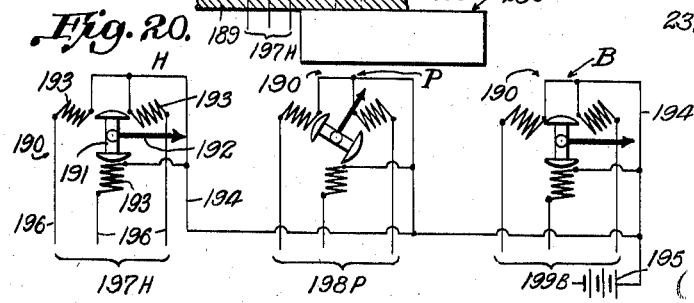
Feb. 18, 1941. P. KOLLSMAN 2,232,537
REMOTE CONTROLLED INDICATOR WITH STABILIZED
HEAD, PITCH, AND BANK INDICATING UNIT
Original Filed April 5, 1932 — 5 Sheets-Sheet 4
Inventor.
PAUL KOLLSMAN Feb. 18, 1941.    P. KOLLSMAN    2,232,537
REMOTE CONTROLLED INDICATOR WITH STABILIZED
HEAD, PITCH, AND BANK INDICATING UNIT
Original Filed April 5, 1932    5 Sheets-Sheet 5
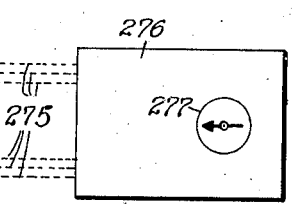
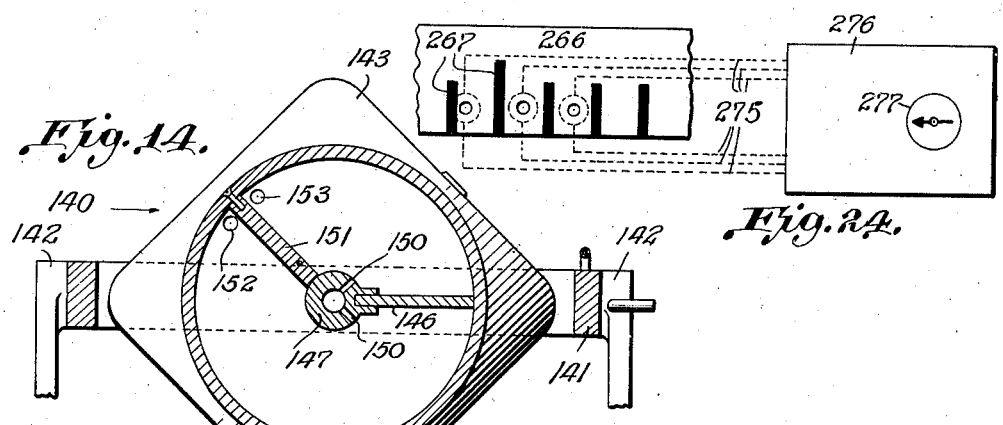
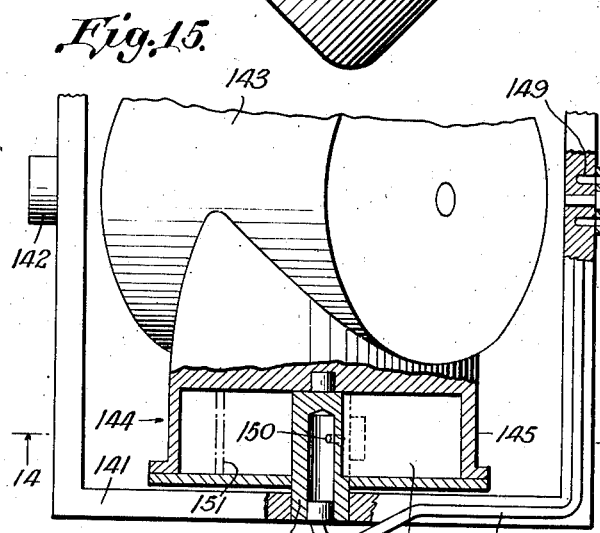
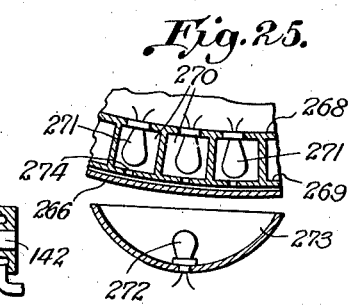
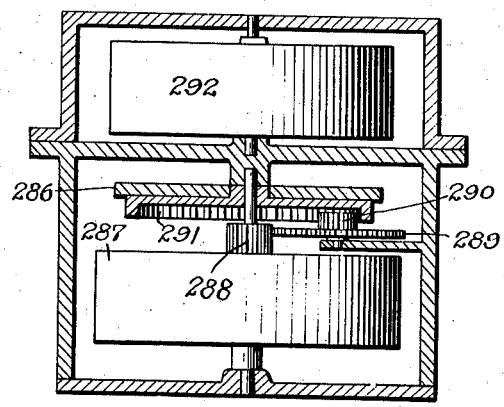
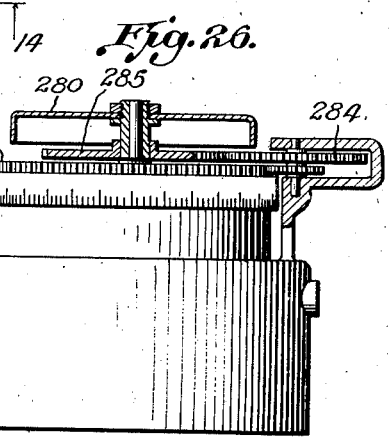
Inventor.
PAUL KOLLSMAN Patented Feb. 18, 1941

2,232,537

UNITED STATES PATENT OFFICE 2,232,537

REMOTE CONTROLLED INDICATOR WITH STABILIZED HEAD, PITCH, AND BANK INDICATING UNIT

Paul Kollsman, Stamford, Conn.

Original application April 5, 1932, Serial No. 603,432. Divided and this application May 17, 1937, Serial No. 143,241

11 Claims. (Cl. 33—204)

This application is a division of my co-pending application, Serial No. 603,432, filed April 5, 1932.

This invention relates to indicating or controlling devices for any condition or position.

One object of the invention is to provide an improved gyroscopically stabilized means responsive to the earth's magnetic field.

Another object is the provision of an improved unitary stabilized means for indicating head, pitch and banking of an aircraft.

Another object of the invention is the provision of an improved device including remote controlled indicators operated by a stabilized head, pitch and banking means.

Another object of the invention is to furnish an improved remote control apparatus adapted to cause a plurality of different motions to correspondingly occur at different points.

Another object of the invention is the provision of an improved follow up means, whereby an actuator force may be transmitted or multiplied.

Another object of the invention is to construct an improved damped gyroscopic device.

Another object of the invention is to provide a gyroscopic device having three axes of freedom, one of which is restricted to automatically operate when one of the others is for any reason incapable of the normal response.

A further object of the invention is to furnish an improved device of the nature set forth having relatively few and simple parts and which is inexpensive to manufacture and assemble, convenient to operate, durable, accurate, reliable and efficient to a high degree in use; and which may embody one or more features of the invention in different improved combinations and arrangements.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view of a device embodying the invention with parts in elevation and other parts in vertical section.

Fig. 2 is a view in front elevation thereof with a part removed.

Fig. 3 is a view in vertical section taken on line 3—3 of Fig. 1.

Figs. 4, 5 and 6 are views in horizontal section taken on line 4—4, 5—5, and 6—6, respectively, of Fig. 3.

Fig. 7 is a view of a modified gyroscopic indicator having three axes of freedom, the indicator being shown in elevation and the casing in section.

Fig. 8 is a view in side elevation on a reduced scale showing a modified device having three axes of freedom.

Fig. 9 is a fragmentary view taken on line 9—9 of Fig. 8.

Fig. 10 is a view in elevation with parts in section showing a modified liquid damped indicator embodying the invention.

Fig. 11 is a view with parts in section and other parts in elevation showing an indicator having a follow up means.

Fig. 12 is a view in vertical section with parts in elevation showing an indicator having a follow up motor and remote control means, embodying the invention.

Fig. 13 is a horizontal sectional view taken on line 13—13 of Fig. 12.

Fig. 14 is a view in vertical section taken on line 14—14 of Fig. 15, showing a follow up means embodying the invention, certain parts being removed.

Fig. 15 is a horizontal view thereof with parts in section.

Fig. 16 is a view in elevation of a modified device embodying the invention and having a follow up means, with some parts removed.

Fig. 17 is a view in elevation with parts in section of an earth inductor indicator embodying the invention.

Fig. 18 is a schematic plan view showing a modification of a follow up means.

Fig. 19 is a schematic plan view showing a device embodying the invention and including a remote control means.

Fig. 20 is a diagrammatic view showing the circuit for the remote control means.

Fig. 21 is a sectional view taken on line 21—21 of Fig. 19, showing a setting device for the remote control means.

Fig. 22 is a diagram showing a circuit for the remote control setting means.

Fig. 23 is a view in front elevation of a remote controlled indicator embodying features of invention.

Fig. 24 is a diagrammatic view in elevation of an indicator having a photosensitive control means.

Fig. 25 is a fragmentary horizontal sectional view showing detail thereof.

Fig. 26 is a view in side elevation of a device having a plurality of direction indication portions.

Fig. 27 is a vertical sectional view of an indicator having means for neutralizing magnetic effects.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, are submitted merely as showing a preferred exemplification of the invention.

Generally described, this invention provides an improved stabilized device which is responsive to the earth's magnetic field. This device may include a magnetic north seeking element stabilized by a gyroscope. The device ought not to be positioned near the engine of the vehicle, but is preferably located in a part of the vehicle or aircraft that is substantially free of magnetic disturbances. Consequently, a remote control means may be employed to operate a suitable indicator at a point where it can be readily observed by the pilot. In the case of aircraft, indications concerning pitch and banking are desirable. Hence the invention may include a unitary arrangement for affording such indications, and any suitable means may be provided for that purpose, it being sufficient that a pendular or gyro means be employed. A compact arrangement is obtained by constructing the direction or head indicating means accordingly, as by taking the pitch or banking angles with respect to the gimbal elements supporting the stabilized means that is responsive to the earth's magnetic field. The readings for head, pitch, and banking may be indicated in a unitary manner directly at the stabilized means and irrespective whether a remote control system is used. But separate remote controlled indicators for the head, pitch, and banking may also be employed. In obtaining the readings for head, pitch, or banking, a follow up means may be used, such as motors operating according to the movements of the stabilized means or the means responsive to the earth's magnetic field. In particular, it will be noted that the power of such responsive means is comparatively very slight, and hence the importance of a power multiplying means which is delicately controlled thereby and is adapted to function as an accurate transmitter. The invention includes various additional features of improvement which will be described hereinafter.

Referring in detail to the drawings, 30 denotes a device embodying the invention. The same may include a mounting such as a casing 31 supported in any suitable manner. This casing may be wholly closed, if desired, and may have a front window 32 of a transparent material such as glass. At the rear of the casing, may be provided a hub 33 or other tubular portion connected or merely open to a source of fluid, as air. At the end portion of said hub, a dust removing means or screen 34 may be provided.

Mounted within the casing is a device 35 which is gyroscopically stabilized and is responsive to the earth's magnetic field. This device is so arranged as to have two axes of freedom, and may include a gyro driven preferably by air. Therefore a sleeve 36 is mounted in the hub 33, and in this sleeve is journaled at 37 a hollow shaft 38, the inner end thereof being adapted to snugly communicate with an opening 39 whereby air is transmitted to said shaft. Fixed on the shaft is a gimbal element 40 having alined hub portions upon which may be journaled at 41 a gimbal means or casing 42 having corresponding hub portions. The latter may include a lower section 43 in which a gyro 44 is mounted. Extending from the hollow shaft 38 is a passage 45 communicating with annular registering passages 46 in the hubs at one of the pivots 41, and a passage 47 may lead therefrom to a point or points where the air for driving the gyro 44 is supplied thereto, as hereinafter described.

The arrangement of the device 35 is preferably such as to render it universally pendulous and balanced in every direction. The casing or frame 43 carrying the gyro is therefore mounted below the plane determined by the axes at 41 and 38 and the gyro may be positioned to spin about a vertical axis 48 central with the device 35. A finger 49 may slidingly engage in an annular groove of the gyro for retaining the same on its shaft 48. The gyro may be rotated by any suitable power means, but preferably a fluid such as air is utilized for this purpose. The invention contemplates the provision of a simple unitary means which shall not only drive the rotor but also damp out the oscillations thereof. Preferably a pendulously controlled air stream is utilized arranged so as to affect the volume, direction or energy of the air stream. For example, a weight 50 is provided pendulously suspended by a suitable flexible preferably metallic corrugated tube 51 communicating with the passage 47 and having an axial orifice 52. The rotor 44 may have angularly spaced openings spaced from the center thereof, such as passages 53 which may have individual inlets 53a in proximity to the center of the rotor. The openings or passages are so arranged as to drive the rotor by impulse or reaction. Thus the passages may have discharge openings 54 at the periphery of the rotor. In order to accomplish the damping, the inlet of each passage, in the arrangement shown, is advanced 180 degrees of its outlet. Now, if oscillation of the gyroscope occurs, the nozzle discharges more air, or less air into certain of the inlets 53, thereby producing a force differing by one quarter phase from the oscillation and tending to quickly damp the same. When this is accomplished, the rotor is again in perfect alinement with the orifice and air is discharged equally and in balanced relation to the different passages, causing a continuous and uniform rotation of the gyro.

Air can be supplied to the gyro under pressure or suction, or both, as by means of a Venturi tube 54a to which air is supplied in the direction of the arrow due to the travel of the aircraft, creating a suction through passage 54b which may be controlled by a screw type valve 54c, the suction being communicated through the passage 53, nozzle 52 and connected passages including 39.

Mounted in the casing 42 so as to be controlled by the gyroscope, is a means responsive to the earth's magnetic field, such as a magnetic north seeking element 55. Preferably a plurality of such elements may be parallelly interconnected and mounted as a unit on a spindle 56 journaled at different points in the casing so that the axis of said element is in fixed alinement with the gyro. While the magnetic element can be disposed at different elevations, it is preferably arranged to lie in a plane determined by the horizontal axes of freedom at 38 and 41 of the gyroscope. In order to accurately indicate the direction or heading of an aircraft, an indicator or compass card 57 may be mounted on the spindle 56 so as to be controlled by the element 55. For the purpose of protecting the sensitive element 55 against magnetic disturbances that might be created by the rotating gyro, an insulating means 58 may be mounted between the compartments of the casings 42, 43 or wholly in the casing 42. The member 58 may be a copper ring. My invention may also contemplate the provision of a gyro which is inherently incapable of affecting a magnetic field, and hence the gyro can be made of Bakelite, glass or other like materials.

Sometimes there is a constant magnetic effect acting upon the element 55 from a certain part of the aircraft, which tends to deflect the element from its true position. To overcome this a suitable compensator 59 may be provided which may include a casing 60 mounted on casing 42 and having a plurality of concentric gears 61, 62 alined with the axis of element 55. These gears are independently rotatable by individual pinions 63, 64 which are separately controlled by members 65. Each of the gears 61, 62 carries one or more magnetic elements 66, 67 which are thus adapted to be set by adjustment at 65 so that the resultant of all magnetic forces is such as to cause the magnetic element 55 to correspond to a true north or other predetermined direction. In order to afford access to the compensator, the casing 31 may have a removable closure 68 such as a screw cap, whereby the members 65 can be adjusted.

The casing 42 may have an opening or window 69 through which the compass card is visible, the scale divisions thereof being read with respect to any suitable relatively stationary mark such as 70 which may be provided on the window 32. In order to show pitch and banking, suitable indications may be provided operating as between the gyroscope and a relatively stationary part. Thus the casing 42 may have an elongated straight line mark 71 at the base of window 69, associated with horizontally spaced marks 72 on window 32. It will be perceived that the marks 71, 72 are disposed substantially in the horizontal plane determined by the axes at 38 and 41 so that accurate reading is assured, and that, due to the proximity of the indicia on the compass card and at 70, 71, 72 easy and rapid observation is afforded, the arrangement being practically unitary in its nature for showing head, pitch and banking of the aircraft. It may be noted that pitch is indicated by a vertical interrelative movement between marks 71, 72, while banking is shown by an interrelative angular movement as between the mark 71 and line determined by marks 72. Moreover, combined pitch and banking may likewise be observed by noting the relative position of marks 71, 72.

In Fig. 7 is shown a modified device 75 embodying the invention and which may be generally similar to the device 30, except a novel principle of general application to gyroscopic devices is shown, in that the gyroscope is provided with a third axis of freedom, this being preferably vertical as shown at 76 and alined with the axis of the gyro. Hence a gimbal element 77 is provided extending from shaft 76 and pivotally supporting gimbal element 40a at 38a. The object in providing a third axis of freedom is that the gyroscope parts sometimes move into a position where the two axes of freedom are insufficient and become momentarily inoperative, upsetting the equilibrium of the gyro and causing the production of violent oscillations. This may occur particularly where the aircraft is executing rapid vertical and horizontal turns. Such inoperative positions are avoided by providing a third axis of freedom. Preferably the latter is limited in its range and may be so arranged as to tend to maintain the gyroscope in a particular angular position, but to come into operation when a force is created due to inoperativeness of the other axes of freedom. In this manner the gyroscope is adapted to operate uniformly for any desired purpose. One advantage of this arrangement is that the window 69 is always caused to face the window 32. One possible arrangement of the means referred to is the provision of a restricting means 78 that may be of yielding nature, such as a coil spring connected at one end to the element 77 and at its other end to the casing, affording a cushioning or damping operation. The air inlet for the gyro may be provided at 79, and the elements 77 and 40a may have communicating air passages 80, 81 extended therethrough substantially in the manner disclosed in Figs. 1 and 3.

In Figs. 8 and 9 is shown a modification of the invention representative of a gyroscope having at least three axes of freedom and provided by suitable gimbal elements or the like, and means to normally restrict the movement at one of the axes but to release the device for such movement when movement about any of the other two axes of freedom cannot for any reason occur. The device 82 may for instance be similar to that shown in Fig. 7 except that a different restricting means 83 is provided, which is relatively positive in action for normally causing the restriction mentioned. Thus a gimbal element 84 may have a hub portion provided with an elongated surface 85 against which presses flatwise a leaf spring 86 mounted at 87 on any suitable stationary member or a casing such as 43. The spring 86 may be of sufficient stiffness torque is exerted, the element 84 causes deflection of the spring, which returns the element to initial position as soon as the torque diminishes.

In Fig. 10 is shown a gyroscopically stabilized device 90 which may be generally similar to device 30, except that the means responsive to the earth's magnetic field is liquid damped. Said means may be in the nature of a magnetic element 91 journaled on a spindle 92 in a casing 93. Associated with said element, there may be a float 94 immersed in a liquid such as oil that completely fills the casing 93. The element may be magnetically shielded by a member 94, and a compass card 95 may be mounted on the float and viewed through any suitable closed transparent window that may be provided in said casing. In order to maintain the damping liquid at an even temperature so as to assure uniform conditions in the instrument a heating coil 96 may be provided which may be arranged to avoid magnetic effects upon the element 91, as by providing said coil with sections in which the current flows in opposite directions for neutralizing the magnetic effects of the heating coil in a conventional manner. Current may be supplied to the heating coil from a battery 97, and may be controlled by a thermostat 98 in said casing. In order to take care of any expansion of the liquid or loss of a minute quantity thereof that may occur, an expansible diaphragm or box 99 may be provided sealed with the casing, the interior of which box may communicate with the atmosphere at 100 if desired. In this way, the entrance of air into casing 93 and the generation of air bubbles which would upset the equilibrium of the device is prevented under any condition.

In Fig. 11 is shown generally a device 101 which may include a follow up means whereby the power of the means that is responsive to the earth's magnetic field is amplified. This principle is of particular advantage with a remote controlled indicator, but may be advantageously employed for actuation of any desired means or control, or merely for directly operating an indicator such as the compass card. The device 101 may or may not be gyroscopically stabilized as hereinbefore described. It is sufficient that the casing 102 carrying the magnetic means is rotatable about an axis at 103 preferably alined with the gyro. Any suitable follow up means hereinafter described may be controlled by the magnetic means so as to rotate the casing 102 and hence the member 104 having a compass card 105 carried thereby. In other respects, the device 101 may be similar to that shown at 30, except that the gimbal element 106 may be pivotally mounted at 107 on a vertical bracket 108 fixed to the casing 109, the air for the gyro being supplied by a flexible tube 110.

In Figs. 12 and 13 is shown a device 111 which may have a follow up system as referred to in connection with Fig. 11. This device may be gyroscopically stablized at 112 and may have at least two axes of freedom including a gimbal element 113 on which the casing 114 is pivotally supported. Within said casing, an inner casing 115 may be provided rotatably journaled therein at 116 about an axis that may be alined with the gyro. Within the inner casing is a spindle 117 alined with said axis and having a carrier 118 for one or more magnetic elements 119 that are responsive to the earth's magnetic field. A compensator 59 may be suitably mounted on casing 114.

A follow up means may be provided actuable by any suitable power but preferably air is used for this purpose. Hence an air stream may be provided that may be caused to operate both the gyro and the follow up means. Accordingly, there may be a passage 120 connected to annular passage 46, the passage 120 communicating with a similar annular passage 121 about the axis 116. From the latter a passage 122 leads to a control valve such as a chamber 123 having a piston 124 therein. The cylinder may have spaced passages 125, 126 alternately opened and closed by the piston which may have a central passage portion 127 of reduced diameter. Associated with the passages 125, 126 is a rotor or turbine wheel 128 enclosed in a chamber 129. This rotor is connected to drive a pinion 130 that engages an annular gear 130a which is secured to the outer casing 114. Hence rotation in either direction can be caused as between the inner and outer casings 115, 114. It will be understood that while the air flow may occur in any desired direction, it preferably occurs through an inlet opening 131 in outer casing 114 which opening communicates with a main casing such as 31 having a suitable inlet. The chamber 129 of the inner casing 115 may have an opening 131a so that the air passes around the rotor according as the passage 125 or passage 126 is open.

For the purpose of controlling the piston 124, suitable means are provided responsive to the magnetic element 119. For example, the carrier 118 may have a vane or valve 132 operating between passages 133 connected separately at 134 to the ends of the cylinder 123. Extending through the end portions of the piston are small bore passages 135 which intercommunicate passage 122 at the central reduced part of the piston with the passages 133 so as to cause a corresponding air pressure on the opposite ends of the piston. Air flow is caused to the passages 133 through an opening 133a in the outer casing 115. Now, if a relative rotation occurs between the magnetic elements 119 and the rest of the device 111, valve 132 moves from central position between passages 133 so as to open one of these passages and close the other. This causes the air pressure at the opposite ends of piston 124 to become unbalanced so that the piston moves and closes one of the passages 126 and opens the other passage 127. The rotor 128 begins to turn and moves the inner casing 115 in the proper direction until the valve 132 is again in substantially central balancing position. Actually the device constantly hunts between the narrow limits determined by the free spacing between the passages 133.

The principle of the motor or follow up means of the device 111 is applicable between any movable parts whatever, and can be utilized, for instance, between a pair of gimbal elements, or a gimbal element and a stationary member.

In order to damp the magnetic element 119, a suitable mechanical damper may be provided, such as a cylinder 136 fixed to casing 115 and closed at one end, and having a light piston or plate 137 movable therein with sufficient clearance to preferably avoid frictional contact with the cylinder walls. Said piston is mounted on a rod 138 connected to carrier 118 so as to have an oscillatory motion. Air moves restrictedly back and forth of the piston whereby the damping action is obtained.

In Figs. 14 and 15 is shown a modified type of motor or follow up means 140, according to a principle which can be employed between parts that are interrelatively movable in any desired manner, but has special advantage for parts that have an interrelative angular motion. Accordingly the arrangement shown may be used as a system controlled by means responsive to the earth's magnetic field, or between different gimbal elements, or between a gimbal element and a relatively stationary manner. Thus a gimbal element 141 may be pivotally mounted at alined axes at 142 and may rotatably carry any desired body 143 which may be, for instance, a signal, control, indicator, or a means responsive to the earth's magnetic field. The advantages of the invention will be best appreciated by considering the body 143 as a pendulous controlled or gyroscopically stabilized position indicating means, or one that carries a means responsive to the earth's magnetic field. A follow up means or motor 144 may be operative between 143 and gimbal element 141 in any feasible manner.

The motor 144 may be operated by any suitable motive power, such as air under differential pressure. The body 143 may carry a cylinder 145 connected thereto, and a radial piston 146 extending from a hollow shaft 147 that may be fixed to gimbal element 141. Said shaft may communicate with a source of air through a tube 148 and annular passages 149, and may have ports 150 for discharging the air on opposite sides of the piston. The cylinder may have an annular wall 151 secured thereto and having wiping contact with the shaft 147. In this manner cylinder chambers are provided and these may have individual outlet ports 152, 153 leading to the body 143 with air passages as shown at 133 so as to be controlled by a valve 132 movable therebetween under operation of means 119, and according to principles shown in Figs. 14, 15.

In operation, the motor 144 is normally practically motionless, except that it may hunt as the valve 132 fluctuates between passages 133. When valve 132 closes one of the passages 133 for any length of time, due to a change in heading of the aircraft, the corresponding outlet 152 or 153 is substantially closed so that a differential pressure is built up as between the chambers of the cylinder. Since piston 146 may be regarded as fixed to the gimbal element 141, the cylinder 145 is caused to rotate and to move the sensitive unit 143 correspondingly. Thereupon the position of valve 132 relative to passages 133 is changed so that substantial equilibrium is again established as long as the same heading of the aircraft is maintained. It will be understood that it is immaterial as far as the general principles of the device are concerned whether gimbal element 141 is relatively stationary and sensitive unit 143 movable, or vice versa. In fact the body 143 may be regarded as a gimbal ring that may support another body of the type disclosed above for 143. In that case one of the gimbal elements will carry a valve such as 132, and the other gimbal element the passages 133, and one of said gimbal elements would carry the cylinder 145 and the other the piston 146. In every case the valve 132 can be actuated in different ways mechanically or otherwise. The motor 144 may be employed for the remote control of instruments in various associations with electrical means as hereinafter indicated.

By utilizing a motor 144 between the gimbal elements, friction and other retarding factors are eliminated and a positive accurate operation is assured. With the principle of the motor 144, a very small force and a relatively small quantity of working fluid is sufficient to cause a large differential pressure to operate the motor.

In Fig. 16 is shown a modification of the follow up motor as applied to a liquid damped gyroscopically stabilized indicator 155 of the nature shown in Fig. 10. In this device the magnetic element 91 is inaccessible, being immersed in liquid, and the compartment therefor must be sealed tight to the extent that not even a spindle may be extended through the wall thereof due to possible leakage of the liquid and entrapment of air which might unbalance the system. Hence the damping effect of the liquid is utilized indirectly by a means responsive to the magnetic influence of the element 91. Thus a magnet 156 is rotatably mounted at 157 in alinement with spindle 92, but without any mechanical connection between elements 156 and 91. The magnet 156 is of small mass and length so as to be little affected by acceleration and other forces created by a movement of the aircraft, but is in proximity to the element 91 so as to be controlled thereby. Therefore the magnet 156 may be individually damped or undamped as desired. A motor such as 144 may be controlled by the magnet 155, as by providing an air relay including passages such as 133 that may be controlled by a valve 132 carried by the magnet and movable between said passages, as shown in Figs. 12 and 13.

In Fig. 17 is shown another modification including an earth inductor 158, having brushes at 159 movably carried by a member 160. The earth inductor may include a gimbal means 161 affording a plurality of axes of freedom about pivots at 162, 163. Separate motors such as 144 may be provided between the gimbal element 161 and the casing of the earth inductor, and between said gimbal element and a support 164 therefor. Fixed on the earth inductor as by means of an arm 165 is a motor 144, the central shaft 166 of which, corresponding to shaft 147, is connected to the member 160 and to an indicator such as a compass card 167. The air relay for the motor may include passages 133 and a valve 132 for controlling the same. The latter may be operated by an electrical means 168 in response to fluctuations in the current of the earth inductor. The means 168 may, for instance, include a current amplifier and a suitable electromagnet and associated means adapted to reciprocate the valve for closing either of the passages 133, according to the changes in the current in the earth inductor. The device 168 can be mounted at 169 on bracket 165.

In operation, the earth inductor is set for any desired direction by moving brushes 159 to correspond thereto. If the aircraft or vehicle changes from said direction, a current is generated in the earth inductor, causing operation of the means 168 according to the direction of said change. Hence motor 144 is operated correspondingly so that shaft 166 turns and moves the indicator 167 and brushes 159 until the effect of the change in direction is neutralized. The device as a whole thus constitutes a means for indicating a deviation from a condition that is to be maintained, as by being responsive to the earth's magnetic field, although not necessarily north seeking. The earth inductor is pendulously arranged and the rotor thereof may operate as a gyro for stabilizing the device.

In Fig. 18 is shown a simple device 170 including a remote controlled indicator 182. Said device may include a gyroscopically stabilized means 171 responsive to the earth's magnetic field and may have a motor such as 144 and gimbal elements such as 172 affording axes of freedom. Mounted on the gimbal element 172 an electrical means may be provided wherein a potential difference or the like may be obtained under the control of the means 171. For instance, a resistor element 173 may have a switch arm 174 slidingly engaged thereby under the operation of the means 171, said switch arm moving with the means 171 in suitable relation thereto about an axis at 175. The indicator 171 may be any conventional type so connected in circuit as to be actuated according to said potential difference. Thus the indicator may have inductance coils 176 connected with a battery 177 or other source of current, and in multiple with the different sections of resistor 173 into which the switch arm may divide the same. Thus the ends of the resistor are separately connected by wires 178, 179 with inductances 176, and both inductances being connected with the battery and switch arm by wires 180. Actuated by the inductances 176 is a rotatable armature or magnet 181 carrying an indicator or pointer 182 for showing a condition or heading. As the switch arm 174 moves, the currents flowing to the different inductances 176 are varied, thereby causing operation of the indicator.

In Figs. 12, 19 to 22 is shown a different kind of transmitter, which may function mechanically or electrically as a step by step transmitter. This transmitter is shown applied to the gyroscopically stabilized means responsive to the earth's magnetic field, so as to remotely control an indicator or indicators for showing head, pitch, and banking of the aircraft. Where pitch and banking readings alone are desired, a gyroscope will suffice for functioning as the actuator. It will be understood that, instead of operating indicators, the invention may be used for automatic control of proper steering or guiding apparatus of the vehicle. However, the advantages of the invention are best exemplified in a device of unitary character as herein shown, having actuating means remote from the engine of the aircraft, and having a remote control system and indicating means operated thereby located near the engine and pilot's seat, for showing the head, pitch and banking of the aircraft.

In the device of Fig. 12, the motor shown in Figs. 14 and 15, or any other kind of motor can be substituted.

Fig. 19 shows diagrammatically a gyroscopically stabilized device responsive to the earth's magnetic field. This device may have a head indicating unit 185, which may correspond to that at 171, and may include a magnetic north seeking element, a gyro rotor, and a follow up motor as shown in Fig. 12. Said unit 185 may be pivotally mounted on a gimbal ring 186 as by means of shafts 187, and the gimbal ring 186 may be similarly mounted by means of shafts 188 on supports 189. With the axes of shafts 188 extending fore and aft, it will be noted that a relative turn between gimbal element 186 and its supports 189 is indicative of banking. Hence this gimbal element may also be designated by letter B. Similarly a relative turn between 185 and element B is indicative of pitch, so that 185 may also be designated by letter P. The means responsive to the earth's magnetic field, or indicative of heading may in this instance be designated by letter H which may be applied to a part which turns with said means about a vertical axis, and may be considered as representative thereof. Separate means may be used for transmitting indications of the different motions above referred to, and separate indicator parts may be operated thereby.

Thus remote controlled indicators 190 may be provided which may be similar in principle, except that they may be differently arranged and calibrated, so that one indicates head H, another pitch P, and a third banking B. While these indicators may be combined together, yet the invention is more clearly understood by the representation of separate indicators.

Each indicator 190 may have an armature 191 carrying a pointer 192, and inductively influenced by a plurality or three coils 193. The coils of each indicator are connected in multiple by conductors 194 with a source of current or battery 195 and each of the coils has a separate wire or conductor 196 leading to the device 111. Hence there are three units or cables of conductors 197H, 198P and 199 B leading to said device.

Considering the unit 197H, the wires thereof are connected individually to conductor elements 200 carried by support 189, and having brushes 201 or the like for contacting conductor rings 202 on shaft 188. From these rings, wires 203 may extend along the gimbal element to member 204 fixed thereon and carrying brushes 205 or the like for slidingly electrically contacting conductor rings 206 on shaft 187. From these rings 206, conductors 207 extend into movable electrical engagement with a ring transmitter member 208 of relatively large diameter fixed on the unit 185. It will be understood that the transmitter ring 208 is so constructed and the conductors 207 so arranged relatively thereto as to cause one after another of the three conductors 207 to effect electrical contact so that a step by step transmission is obtained. For instance, the transmitter ring 207 may be provided with sectional conductors or teeth in a well known manner, and the conductor portions of the transmitter ring and the conductors 207 may be offset relatively to each other for the successive operation, in a well known manner.

The unit 198P may likewise be connected to brushes 209 mounted on an opposite portion of the support 189, and engageable with rings 210 on adjacent shaft 188, conductors 211 leading from these rings to brushes 212 mounted on gimbal element 186, for slidingly contacting transmitter rings 213 fixed on a portion of shaft 187. Rings 213 may be of relatively large diameter and they and the conductors or brushes 212 may be arranged in a manner similar to that described for 207, 208. A similar arrangement including transmitter rings 214 and brushes or conductors 215 may be utilized in connection with conductor unit 199B. The circuit may be completed by extending a conductor 216 from battery 195 to a brush 217 slidingly contacting a conductor ring 218 on shaft 188, and from which ring a conductor 219 may have contact at 220 slidably or otherwise at any desired region with each of the transmitter rings 214 thus completing the circuit therewith. The conductor 219 also extends along gimbal element 186 to brush or conductor 221 which contacts ring 222 on shaft 187 and from which ring may extend a conductor 223 which may slidingly engage transmitter ring 208 as at 224 for completing the circuit therewith. The conductor 223 may extend along the device 185 and effect sliding electrical contact as at 225 with each of the transmitter rings 213, completing the circuit thereto. It will be understood that all parts are electrically insulated wherever required, and that each group of transmitter rings may be made in the form of one ring or in any other conventional manner.

In order to permit the system including the remote control apparatus to be reset in the event that an indicator 190 should fall out of step with the actuating indicator, a novel, simplified arrangement is provided which is applicable to different kinds of remote control means, and for different applications thereof. Separate setting devices 230 may be provided for correction in the head, pitch and banking indications, both at the actuating indicator and at the remote controlled indicator, and these devices may be of similar construction. Each may include a plurality of elements movable in opposition to each other, one of the elements being preferably automatic, and the device being arranged so as to cause a return of parts controlled thereby to an initial position in a single direct movement regardless of the position of such parts. One form of construction is that each of shafts 116, 187, and 188 which turns with a change in head, pitch, or banking, shall be provided with a member such as a crank arm 231. Associated with the latter is a movable member such as an arm 232 which is pivotally mounted at 233 in a casing 234. The arm 232 may constitute an armature of an electromagnet 235 that is normally energized so as to hold the armature against the force of a tension spring 236 and out of the path of rotation of the crank arm 231. When electromagnet 235 is released, the armature 232 moves under the influence of said spring so as to engage the crank and turn the same to an extreme position toward the left relative to Fig. 21. By making the crank offset of sufficient radial length, accuracy in setting is obtained, and the positiveness of the device may be further increased by providing a guide or notch 237 in the armature engageable with the crank arm in the extreme initial setting position.

The electromagnets 235 of each of the devices 230 may be energized in any suitable manner, but preferably devices used for instance, for a correction in pitch reading, and provided at the actuating indicator and at the remote controlled indicator are connected in a single circuit so as to be operated simultaneously by a unitary means such as a switch. Thus a conductor may lead from battery 195 to a ring 238 on shaft 188, and a conductor 239 may extend from said ring along the gimbal element 186 to electromagnet 235, the circuit being completed as by grounding. A conductor 240 may extend in any suitable manner from conductor 239 to a brush 241 engageable with a plain contact ring 242 for furnishing current to device 230 which is used for setting the unit 185 about its vertical axis. The device 230 for banking setting about shaft 188 can be connected into the circuit in a similar manner with conductor 239.

In Fig. 22 is shown diagrammatically the circuit for the different setting devices 230. Those at the actuating indicator may be marked P, H and B for pitch, head and banking respectively, and those at the remote controlled indicators 190 may be correspondingly marked p, h, and b. All the setting devices 230 may be connected in any suitable circuit in series or parallel, preferably the latter, and the circuit may be independently arranged so that operation of devices 230 will not affect any other part of the remote control means or associated devices. Thus a battery or source of current 245 may be provided having a main line 246 from which extend branches 247 individually to the different devices 230. The latter and the battery may be grounded as at 248. In the main line, a switch 249 may be provided, so that, on opening the same, all the electromagnets 235 are deenergized and the entire system moved as a unit to initial positon, whereby a lack of synchronization is corrected. Then on again closing the switch 249, the system is adapted to operate in the normal manner.

It will be perceived according to Fig. 22 that the different remote controlled indicators 190 may also be similarly movable, as about vertical axes and according to suitable scales.

In Fig. 23 is shown a remote controlled indicator 250 which may perform the functions of indicators 190. For instance a single relatively stationary casing 251 may be provided having a glass window 252. In this indicator, a fixed unit 253 may be provided that may have a stationary pointer 254 and a rotatable compass card 255.

Unit 253 may be actuated in any suitable manner, or as shown at 190 in Fig. 20. The casing 251 may also have a unit 256 mounted therein, which unit may include gimbal elements affording two axes of rotary movement at 257, 258, lying in a normally horizontal plane. Actuating means such as 259, 260 may be provided separately controlling the movement about the respective axes. The actuating means 259, 260 may be of any suitable type and can be devices such as shown at 190 in Fig. 20. One of the means 259 may operate between the gimbal element 262, and the other means 260 may operate between gimbal element 262 and a member 263. The latter may be of any suitable size, weight, or form and may be balanced in every direction about the axis at 258. Said member 263 may merely carry an elongated mark 264 lying in the plane of axes 257, 258, and the window glass 252 may carry marks 265 alined with mark 264 at opposite ends thereof, whereby pitch and banking is indicated, according as the mark 264 moves up or down, or angularly about the axis at 258.

In Figs. 24 and 25 is shown a modified device with a different remote control means which may include means sensitive to radiant energy. Thus an indicator such as a compass card 266 may be of translucent or transparent character and may have scale divisions provided by relatively thick marks 267. Back of the compass card, a relatively stationary member 268 may be provided having a front wall 269 in comparatively close proximity to the compass card. Member 268 may have a plurality of compartments 270 in which photosensitive cells 271 may be mounted so as to be activated by light from a lamp 272 uniformly reflected with the aid of a reflector 273 through openings 274 in the front wall of the compartments so as to separately affect the photosensitive cells. The openings 274 and their corresponding cells 271 are so spaced as to correspond with the marks 267 in such manner that one after another of the cells 271 are cut off from light, in a continuous series. Therefore the spacing between openings 274 may be different or a little greater than that between the marks 267. The different photosensitive cells may all be connected by conductors 275 with a device 276, and the currents amplified if desired, and caused to actuate a galvanometer or other indicator 277, with the aid of a step by step transmitter or in any other feasible manner. A similar arrangement can be used for transmitting pitch, banking, or other change of a condition.

In Fig. 26 is shown a device wherein an indicator is provided adapted for minute reading over a wide range. Thus a plurality of indicator elements such as compass cards 280, 281 may be provided in erconnected preferably in coaxial relation with each other. Thus the compass card 281 operates in any suitable manner or as hereinbefore described by a gyroscopically stabilized means responsive to the earth's magnetic field. Movable with said compass card is a concentric gear 282, power being supplied as by a motor 144. Gear 282 turns a large gear 284 which engages a gear 285 that may be connected to compass card 280 for moving the same. The compass cards 280, 281 move in synchronism and have their scale divisions arranged accordingly, any suitable speed reduction means being utilized so that member 280 has a greater angular movement than member 281 for a given change in a condition.

In Fig. 27 is shown a modification of the invention having means for neutralizing magnetic effects generated by the gyro rotor so that they may not affect the means responsive to the earth's magnetic field. Said means may consist in the provision of a rotor such as 286 turning in opposite direction to the gyro rotor 287. These rotors may be interconnected by any suitable drive. The latter may include a pinion 288 fixed thereto and engaging a gear 289 mounted on an arm of the casing and turning a pinion 290, the teeth of which mesh with those of an internal idler gear 291 connected to the rotor 286 so that the same turns in opposite direction to the gyro rotor. A means 292 responsive to the earth's magnetic field thus generates eddy currents in both rotors in opposite directions. By properly selecting the materials of the rotors with particular regard to their mass, shape, speed and location relative to the magnetic element, the effects of the eddy currents generated in each rotor, on the magnetic means 292 may be made equal and in opposite directions, so that the magnetic element is undisturbed by the rotation of the rotor 287. In all other respects the device may be the same as hereinbefore described, and may constitute a gyroscopically stabilized means responsive to the earth's magnetic field.

Various features of the invention shown and described herein may be usefully employed separately and in different combinations and arrangements, using the devices herein shown or substituting conventional constructions in place of certain features. In particular the invention may include the remote control system with a means responsive to the earth's magnetic field, such as an earth inductor, or with a magnetic north seeking means, whether damped or undamped. In every case the power amplifying motors or devices can be used, or the photosensitive arrangement employed, sensitivity in reading afforded, and the means responsive to the earth's magnetic field suitably shielded or positioned against magnetic disturbances. A unitary simplified system is obtained which functions accurately and which may be observed conveniently and quickly reset whenever desired to assure the operator against errors in the system.

The bearings may be jeweled or spring mounted throughout to assure of minimum friction and maximum accuracy of alinement. Non-magnetic materials may be employed wherever feasible, and hence the bearings of the gyroscopic stabilizing mounting or a substantial part of the latter can be made of stainless steel or the like. Soft iron shields may be used wherever necessary to protect the magnetic element from undesirable effects of the stabilizer, caused by magnetic materials or by eddy currents generated in the rotor of the stabilizer.

Certain errors in indication may be compensated for by properly relating the indicating means to the magnetic element for a certain average velocity of the gyro rotor, as by shifting the compass card to a suitable degree in opposite direction to that of rotation of the gyro rotor from the position of the magnetic element which is correct when the gyro is not rotating. While the gyro may be electrically rotated it is preferably spun by means of a fluid such as an air flow caused by a pump such as a Venturi means. Likewise the power amplifying motors may be operated by any suitable means or even by power obtained by the gyro rotor. In general any kind of fluid power such as air or electricity may be used for operating any part of the system. The power amplifying motors may also be used for controlling the remote controlled indicator. The magnetic element which may consist of a permanent steel magnet, electromagnet, or the like may be kept alined with the gyro motor in any suitable manner. While a separate element is used for indicating heading or direction, a single element may be arranged to show position including heading, pitch or banking, or any combination thereof, and thus the compass card itself may be arranged to be not only rotatable but also adapted to move angularly relative to a horizontal plane.

It will be appreciated that various changes and modifications may be made in the device as shown in the drawings, and that the same is submitted in an illustrative and not in a limiting sense, the scope of the invention being defined in the following claims.

I claim:

1. A device including a gyro, a plurality of gimbal elements for universally mounting the gyro about three axes in planes at right angles to each other, and means for restricting the movement of one of the gimbal elements so that the gyro normally possesses two axes of freedom, the restricting means releasing said gimbal element when force in excess of a predetermined amount is applied to said element by reason of the fact that another of the gimbal elements is in inoperative position.

2. A device including a gyro vertical, means responsive to the earth's magnetic field carried and stabilized thereby, and means for preventing the gyro from affecting the responsive means, including a rotor disposed between the gyro and the responsive means and having an axis coincident with the axis of said gyro and rotatable in opposite direction to the gyro.

3. In a compass, the combination of a closed liquid filled casing, and a rotatable magnetic element mounted in the casing so as to be damped by said liquid, of means for imparting heat to said liquid, including electrical resistances arranged for counteraction of their magnetic effects so as not to influence the element, and thermostatic means directly actuated by the temperature of said liquid for controlling the heating means.

4. In a compass, the combination of a liquid filled casing, and a rotatable magnetically actuated float means immersed in the liquid and adapted to damp vibrations thereof, of means immersed in said liquid for maintaining substantially constant the temperature of the liquid, whereby the density and damping action is rendered constant.

5. In a device subject to magnetic effects caused by electrical currents, the combination with a magnet and stabilized mounting means therefor including a gyro, of a rotor intermediate of the magnet and gyro, and means to cause said rotor and gyro to rotate in opposite directions, whereby the rotor shields the magnet against magnetic disturbances caused by the gyro, as set forth.

6. In a device subject to magnetic effects caused by electrical currents, the combination with a magnet and stabilized mounting means therefor including a gyro, of a disc intermediate of the magnet and gyro, said magnet having an axis coaxial with the disc and gyro, said disc being of substantially smaller mass than the gyro, and means to cause said disc and gyro to rotate in opposite direction.

7. The combination of an instrument casing; a gimbal element mounted therein for movement about a substantially vertical first and a substantially horizontal axis; a rotor bearing casing mounted on said gimbal element for movement about a third substantially horizontal axis normal to said second axis; a gyro rotor supported by said casing about a substantially vertical spin axis; and a spring between said element and said casing biasing said gimbal element about said first axis towards a predetermined position relatively to said casing, thereby providing a yielding mounting of the gyroscope.

8. A device including means responsive to the earth's magnetic field, universally mounted gyro stabilized means for mounting the same, a liquid filled container enclosing the responsive means, heater means in immediate thermal contact with said liquid and heating the said container and liquid filling, and means for automatically controlling the heater means in response to changes in temperature of the liquid.

9. A device including an actuator; a remote control means operated thereby; means operated by the remote control means; and means for setting the actuator and the remotely operated means in corresponding positions, said setting means including individual setting elements for the actuator and the remotely operated means movable by said actuator and operated means respectively, members for moving said elements into predetermined initial positions, first actuating means tending to move said members into a position in which said elements are operatively disassociated from said members, second actuating means tending to move said members into a position for setting said elements into said predetermined initial positions, and control means for controlling one of said actuating means.

10. The combination of an instrument housing adapted to be fixedly mounted on aircraft as to partake of all movements of the craft; a rotor casing; a gyro rotor mounted in said casing about a first spin axis; supporting means for supporting said rotor casing about a second and a third axis normally at right angles to each other and to the spin axis; means for mounting said rotor casing and supporting means as a unit in said housing about a fourth axis normally aligned with said spin axis, said supporting means providing sufficient freedom for the rotor casing to align the rotor spin axis with one of said second and third axes; and a spring acting between said housing and said supporting means for resiliently restraining the movement of said rotor casing and supporting means about said fourth axis, whereby damage to the gyroscope is prevented at operating conditions under which the spin axis becomes aligned with one of said second and third axes.

11. The combination of an instrument housing adapted to be fixedly mounted on aircraft as to partake of all movements of the craft; a rotor casing, a gyro rotor mounted in said casing about a vertical first spin axis; supporting means for supporting said rotor casing about a second and a third axis normally horizontal and at right angles to each other and to the spin axis; means for mounting said rotor casing and supporting means as a unit in said housing about a fourth axis normally aligned with the spin axis; and a spring acting between said housing and said supporting means for resiliently restraining the movement of said rotor casing and supporting means about said fourth axis, whereby damage to the gyroscope is prevented at operating conditions under which the spin axis becomes aligned with one of said second and third axes.

PAUL KOLLSMAN.